June 7, 1927.
L. D. COPELAND
1,631,519
DIRIGIBLE LAMP FOR AUTOMOBILES
Filed Jan. 22, 1925
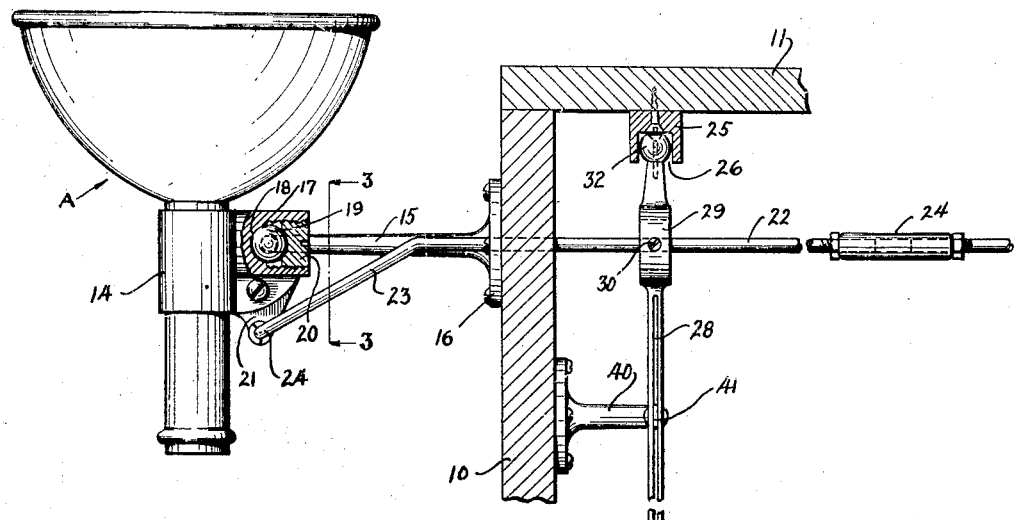
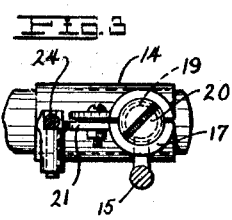
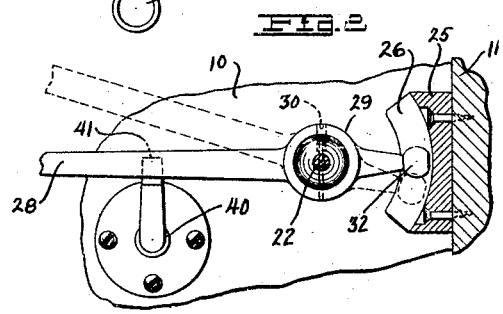
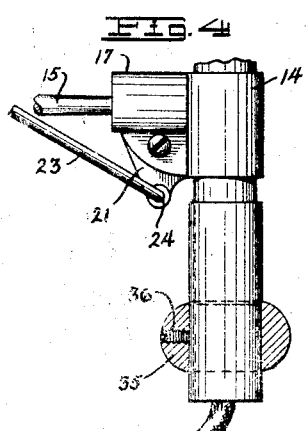
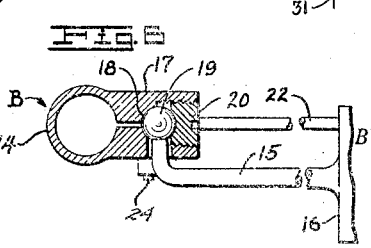
INVENTOR.
LUCIUS D. COPELAND
BY *B. J. Craig*
ATTORNEY.

Patented June 7, 1927.

1,631,519

UNITED STATES PATENT OFFICE.

LUCIUS D. COPELAND, OF LOS ANGELES, CALIFORNIA.

DIRIGIBLE LAMP FOR AUTOMOBILES.

Application filed January 22, 1925. Serial No. 4,010.

This invention relates to dirigible lamps for automobiles.

The general object of the invention is to provide a device for lighting the roadway for automobiles wherein a pair of dirigible spot lights are mounted for universal movement and are so connected that they can be operated in unison either by the driver of an automobile or by his companion.

One of the specific objects of the invention is to provide an improved spot light mechanism wherein a spot light is mounted at each end of the wind shield and wherein an operating member arranged adjacent the steering wheel serves to move the spot lights in synchronism.

A further object of the invention is to provide a spot light operating mechanism whereby the light may be operated by means of a hand lever arranged adjacent to the steering wheel.

Other objects of the invention will be apparent from the following description taken in connection with the accompanying drawings wherein Fig. 1 is a top plan view of a portion of an automobile showing the details of my spot light and the controlling means therefor; Fig. 2 is a side elevation of a portion of the operating member; Fig. 3 is a section on line 3—3, Fig. 1; Fig. 4 is a plan view of a portion of one of the spot lights showing the adjustable weight; Fig. 5 is a diagrammatic plan view showing the arrangement of the spot lights with relation to the steering wheel and Fig. 6 is a sectional detail partly in elevation of the lamp B.

Referring to the drawing by reference characters, I have shown a portion of the body of an automobile at 10, and the instrument board at 11. Mounted at each side of the body and at each end of the wind shield I show a spot light 14. Each of the spot lights may be of the well known type including a reflector, a lens and a supporting portion. Each spot light is mounted on a bracket 15 which may be secured by screws 16 to the body of the automobile.

The spot lights are mounted for universal movement and in order to effect this, I show the body of the spot light as provided with a support 17 thereon which is recessed as at 18 to form a socket member in which a companion member 19 of a ball and socket joint is secured. The member 19 may be removably held in place by a threaded clamping member 20 as shown.

Each of the spot lights it will be understood are identical in construction with the exception that one is fitted for right hand movement while the other is fitted for left hand movement.

Mounted upon each of the spot lights adjacent the support 17 I show a wing 21 which has an elongated lug thereon. This lug is apertured to receive the turned over extremities of a rod 22. This rod extends across the automobile from one side to the other and extends through apertures in the side of the body. Each end of the rod is preferably bent at one end as at 23 and the extremities of the rod at each end is turned down as at 24 so that the turned down portion may fit within the aperture in the wings 21. The rod may be provided intermediate its length with a turn buckle 24 for adjustment, if desired.

From the foregoing description, it will be apparent that when the rod is moved to the right or to the left in Fig. 1 that the two spot lights will move in synchronism as the rod is moved back and forth. The axis of the rod 22 coincides with one axis of the spot light so that when the rod is rotated on its axis it will cause the spot lights to turn about a horizontal axis. This last movement effects the vertical movement of the spot light while the cross movement effects the lateral movement of the spot lights.

From the foregoing description, it will be apparent that both lamps may be moved universally within certain limitations, by shifting the rod 22.

In order to provide a simple means for shifting the rod 22 I show the instrument board 11 as provided with a member 25 which has an arcuate slot 26 therein. Mounted upon the rod 22 I show an operating member 28. This operating member is provided with a central recess 29 through which the rod 22 extends. The operating member 28 is pivoted on the rod 22 by means of threaded top and bottom pins 30 so that this member can swing laterally by turning on the pins. The pins 30 so connect the operating member that when the latter is rocked the rod 22 is rocked. One end of the operating member is provided with a handle portion 31 and the other end has an enlargement 32 which moves up and down the arcuate slot 26 as the rod 22 rotates.

The operating portion 31 is preferably arranged adjacent the steering wheel 33 of the automobile so that this portion 31 may be grasped by a finger of the driver for the purpose of moving the spot lights. The arm 28 serves as a counterbalance to hold the spot light A (at the left) in position. In order that the spot light B (at the right) may be suitably counterbalanced, I show the shank of the spot light 14 as provided with a movable counterweight 35 which may be of suitable metal. This counterweight is shown as provided with a threaded clamp 36 for holding it in adjusted position.

It is extremely important that the spot lights be nicely balanced for when this perfect balance is secured I find in driving an automobile over the roughest roads that the spot lights will hold the position in which they are set.

In many communities the laws and regulations are such that means must be provided whereby the spot lights cannot be pointed in a direction to blind the eyes of an approaching driver. To effect this requirement, I arrange a bracket 40 within the body of the automobile 10. This bracket is provided with an upstanding arm 41 and the arrangement is such that the arm 41 would prevent an operator from turning the spot light in a manner to blind an approaching driver. Complete universal movement of the spot lights is effected on both sides of the projection 41 and the spot lights may be turned at either side to illuminate ditches along the side of the road or to illuminate signboards as well as to illuminate the roadway.

In some instances it would be desirable to have an operating member at each side of the front seat so that the driver's companion may operate the spot lights. When this is done, I provide a second operating member as shown in dotted lines at 45 in Fig. 5. When this arrangement is provided, I omit the counterweight 35 from the spot light B since the added arm 45 serves to balance the light B.

It will be understood, of course, that with my invention I may omit one of the lights A or B entirely and may use my improved spot light controlling means with but one spot light.

By referring to the drawing it will be noted that all the planes passing through the axis of the straight portion of the rod 22 intersect in one of the axes of the ball 19.

Having thus described my invention, I claim:

1. In combination with an automobile having a body and having a steering wheel, a spot light adjacent to one side of the body, means to mount said spot light for universal movement, means to control universal movement of said spot light, said means comprising a single rod extending across the body of the automobile, said rod having its axis coincident with one of the axes of the spot light, said rod being bent at each end, a wing on said spot light, said bent portion of the rod pivotally engaging said wing in an elongated bearing, the axis of said last mentioned engagement being at one side of the axis of said rod.

2. In combination with an automobile having a body and having a steering wheel, a spot light adjacent one side of the body, means to mount said spot light for universal movement, a rod mounted on the body of the automobile, said rod having its axis coincident with one of the axes of said spot light, said rod being bent at one end, a wing on the spot light, said bent portion of the rod pivotally engaging said wing, the axis of said last mentioned engagement being at one side of the axis of said rod, the construction being such that when the rod is rotated the spot light will rotate about an axis substantially coincident with the axis of said rod and when the rod is moved laterally the spot light will move laterally, and means to move said rod laterally and to rotate it.

3. In combination with an automobile having a windshield, a pair of spot lights, one mounted near each end of the windshield, said mounting including means whereby each spot light can be moved about a vertical and horizontal axis, a rod pivotally connected to each of said spot lights, said rod being connected to each spot light on one side of said vertical axis whereby when said rod is moved laterally or vertically the spot light will be actuated and means to move said rod, said means comprising an operating member pivoted on said rod upon a vertical pivot, one end of said member being held against lateral movement whereby lateral movement of the other end of said member causes the rod to move laterally to move the headlights laterally, said first mentioned end of said rod being mounted for vertical movement whereby when the operating member moves vertically the rod will rotate to control the vertical position of the headlights.

4. The combination of an automobile having a body and having a steering wheel, a spot light mounted for universal movement on each side of the body, a rod connecting said spot lights, said rod being bent, and the bent portion being attached to each spot light at a point at one side of an axis of rotation of the spot lights, the major portion of said rod being straight and having its axis coincident with an axis about which the spot light turns, an operating member for said rod, said operating member being pivotally mounted on the rod and having at one end a headed portion adapted for vertical movement, a stationary slotted member in which said headed portion moves, said headed portion and slot preventing lateral movement of the end of the rod upon which they are arranged, the construction being such that when the operating member is moved sideways the spot lights will be moved laterally and when the operating member swings vertically the vertical position of the spot lights will be controlled.

In testimony whereof I hereunto affix my signature.

LUCIUS D. COPELAND.